March 20, 1945.  G. G. McNAMARA, JR  2,371,835
STEERING MECHANISM
Filed Aug. 31, 1942
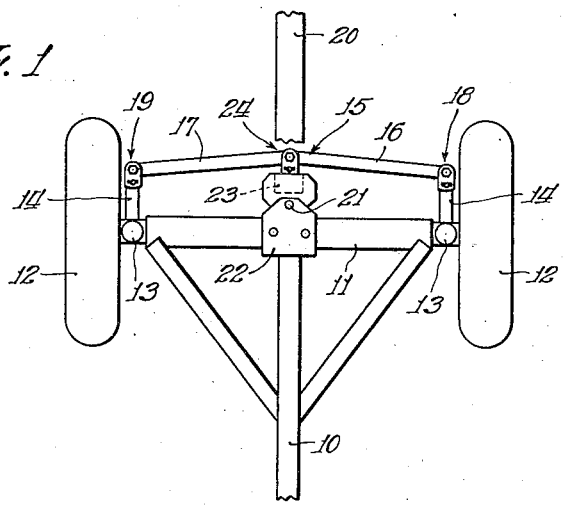
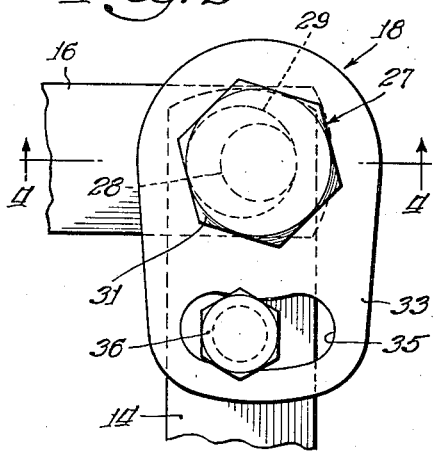
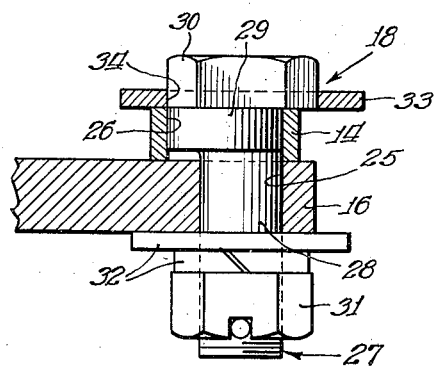
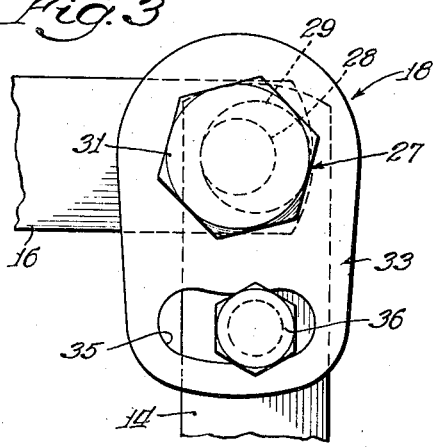
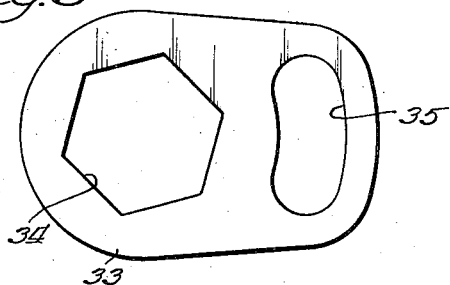
Inventor:
Gordon G. McNamara, Jr.
By: Paul A. Pippel
Atty.

Patented Mar. 20, 1945

2,371,835

UNITED STATES PATENT OFFICE 2,371,835

STEERING MECHANISM

Gordon G. McNamara, Jr., Chicago, Ill., assignor to International Harvester Company, a corporation of New Jersey Application August 31, 1942, Serial No. 456,774

3 Claims. (Cl. 280—33.55)

This invention relates to a steering mechanism and, more particularly, to such mechanism for a trailing vehicle or similar wagon.

The invention is especially applicable to trailer vehicles for the purpose of providing adjustment for the steering mechanism of such vehicles. One of the problems heretofore encountered and now obviated by the present invention consists in the adjustment of the draft tongue of the trailing vehicle so that the trailing vehicle properly "tracks" with respect to the draft vehicle. Commercial trailers of the type now known are provided with automobile type steering means consisting of a transverse tie-rod connected in the usual manner to steering arms on the respective wheels. The draft tongue is suitably interconnected with the tie-rod so that the wheels are steered to follow the draft vehicle. Misalinement of the draft tongue with respect to the trailer frame and steerable wheels results in a failure of the trailer to follow the draft vehicle in proper alinement therewith.

The principal object of the present invention is to provide improved steering means for a vehicle, and particularly for a vehicle of the trailer type.

An important object is to provide an improved connection between the draft tongue and the steerable wheels of such vehicle.

Another important object is to provide an improved adjustable means providing for simple and quick adjustment of a pair of interconnected parts.

And, another object is to provide an improved adjustable locking means for the adjustable means.

These and other important objects, and desirable features of the invention will become apparent as the disclosure is fully made in the following detailed description and accompanying sheet of drawings, in which:

Figure 1 is a plan view of the front portion of a trailing vehicle embodying a preferred form of the invention;

Figure 2 is an enlarged plan view of a pair of members connected by the improved adjustable means;

Figure 3 is a view similar to that in Figure 2 and showing the locking means in a different position;

Figure 4 is a transverse sectional view taken on the line 4—4 of Figure 2; and

Figure 5 is a view of a locking plate, per se.

As previously stated, the steering mechanism provided according to the invention may be adapted for use in any type vehicle, and the particular form of adjustable means may be adapted for use in other instances. Accordingly, the present disclosure is to be deemed illustrative and not limiting.

For the purposes of illustration and description, the invention has been illustrated as embodied for use in a trailing vehicle. As shown in Figure 1, this vehicle includes a frame or body 10 having a transverse front axle bolster 11, at the opposite ends of which are carried steerable front wheels 12. Each wheel is carried on a spindle including a king pin 13 mounted on a vertical axis. Each king pin and spindle may form a knuckle of any conventional type. To each knuckle is connected a forwardly extending steering arm 14, and these arms are cross-connected by tie-rod means 15. In the present instance, the tie-rod comprises a pair of tie-rod parts or bars 16 and 17. The rod or bar 16 is pivotally connected to the right-hand steering arm by means of adjustable connecting means indicated generally at 18. The left-hand tie-rod bar is pivotally connected to the left-hand steering arm 14 by a similar means 19. The details of these connecting means will be described below.

The trailer further includes a forwardly extending draft tongue or member 20, pivotally connected at its rear end by a pin 21 to a bracket 22 on the front axle bolster 11. The draft tongue includes a portion 23 including a pivotal connection 24, by means of which the tie-rod parts 16 and 17 are connected to the tongue. The connecting means 18, 19, and 24 are substantially similar, and a description of one will suffice for a description of all. The following description refers to the right-hand connection 18.

As best shown in Figures 2 and 4, the tie-rod part 16 is provided with a vertical cylindrical bore or opening 25; the steering arm 14 is provided with a larger cylindrical opening or bore 26. The parts 14 and 16 are pivotally connected together by a securing element in the form of a bolt 27 having a threaded shank portion 28, a lug portion 29 offset radially from the axis of the shank 28, and a head 30, preferably in the form of a hexagon or any other many-sided portion.

The bolt 27 is passed through the openings 26 and 25 in the parts 14 and 16, respectively. A nut 31 is threaded on the shank 28, and a pair of washers 32 completes the assembly. The shank 28 preferably fits the opening 25 snugly and is rotatable therein when the nut 31 is loosened, as will hereinafter appear. The eccentrically arranged or offset lug portion 29 similarly snugly fits the opening 26 in the part 14, and the head 30 appropriately engages the upper surface of the steering arm 14.

Adjustment between the parts 14 and 16 is accomplished by a loosening of the nut 31 and a subsequent rotation of the bolt 27. It will be noted that this may be achieved without the removal of the bolt from its associated parts. Because of the eccentricity of the lug 29 with respect to the shank 28, an adjustment transversely of the axis of the bolt 27 will result. In the particular instance of the connection 18 illustrated, such adjustment may be for the purpose of adjusting the toe-in of the right-hand wheel 12. A similar adjustment of the left-hand connection 19 may effect a similar result in the left-hand wheel 12.

The connection 24 between the tie-rod parts 16 and 17 and the draft tongue 20 is substantially identical to that described, except that the bolt in this instance is sufficiently long to accommodate the two bars 16 and 17. Adjustment in this instance permits transverse swinging of the draft tongue 20 with respect to the tie-rod 15, the draft tongue swinging about the pivot pin 21 on the front axle bolster 11 of the trailer. Consequently, the angle assumed by the draft tongue with respect to the trailer frame and tie-rod may be varied, so that the trailer will properly track with respect to the draft vehicle. It is to be noted that the adjustment of the connection 24 does not in any way affect the alinement or toe-in of the wheels 12.

Another important feature of the invention is the means by which the adjustable conections 18, 19, or 24 may be locked. The following description pertains to this lock, it being remembered that the lock is the same in any one of the connecting means 18, 19, or 24.

As best shown in Figure 5, the lock comprises a locking plate 33 formed with a hexagonal opening 34 and an arcuate slot 35. The opening 34 is of a size and shape adapted to fit or engage the head 30 of the bolt 27. The arcuate slot 35 is preferably formed about the axis of the opening 34.

As shown in Figures 2 and 4, the plate 33 is fitted over the connection 18, so that the opening 34 in the plate engages the head 30 in the bolt 27. The slotted portion of the plate 33 overlies the upper surface of the steering arm 14, the slot being engaged by a set-screw or equivalent threaded member 36 carried by the steering arm. The plate 33 also serves to provide means by which the bolt 27 may be moved angularly. Adjustment of the bolt is accomplished by a loosening of the stud 36 and a loosening of the nut 31 on the bolt 27, followed by moving of the plate 33 to either side as desired. The slot 35 permits a limited amount of angular movement of the plate 33 and bolt 27. In most cases it will be found that a slight amount of movement will accomplish the adjustment required. After this adjustment is effected, the stud 36 and nut 31 may be tightened.

In the event that additional adjustment of the bolt 27 is required, the plate 33 may be temporarily removed and reassembled, with the opening 34 assuming a different position with respect to the head 30 of the bolt. Such a result is obtainable because of the plurality of possible engagements between the sides of the hexagonal head 30 and opening 34. Consequently, the bolt 27 may be rotated with respect to the steering arm 14 and tie-rod part 16 through a full 360 degrees, thus affording maximum adjustment.

It will be seen from the foregoing description that there has been provided a simple adjusting means providing for adjustment between either the steering arms and the tie-rod, or the tie-rod and the draft tongue. In certain circumstances it may be desirable to utilize all three adjustments. As previously stated, adjustment of the connection 24 may be made without disturbing the adjustment of the wheels 12. Similarly, the wheels 12 may be adjusted with respect to the tie-rod parts without disturbing the connection 24 between the tie-rod and draft tongue. An important feature of the invention lies in the arrangement which permits any or all of these adjustments to be made without necessitating a complete disassembly of parts. Another important feature of the invention is the locking means, particularly the provision that enables the locking plate to be moved to a plurality of positions with respect to the head of the adjusting bolt 27.

Other features and advantages will undoubtedly suggest themselves to those versed in the art, as will certain changes of construction, it being understood, however, that the foregoing description and illustration relate to only a preferred embodiment of the invention, in which numerous modifications and alterations may be made without departing from the spirit and scope of the invention as defined in the appended claims.

What is claimed is:

1. In a vehicle having a frame, a pair of transversely spaced wheels; a pair of means respectively mounting the wheels on transversely spaced, vertical axes for steering; a pair of steering arms respectively connected to the wheels; a transverse tie-rod; a pair of eccentric adjustment means respectively connecting the tie-rod at its opposite ends to the steering arms; a draft member; means mounting the draft member on the frame for swinging movement transversely of the frame; and means connecting the draft member to the tie-rod for steering the wheels, said means including an eccentric adjustable connection for transverse adjustment of the draft member with respect to the tie-rod independently of adjustment of the tie-rod with respect to the steering arms.

2. In a vehicle having a frame, a pair of transversely spaced steerable wheels, a pair of means respectively mounting the wheels on transversely spaced, vertical axes for steering, a pair of steering arms respectively connected to the wheels, a pair of transverse tie rods joined centrally of the pair of wheels by an eccentric adjusting means, other eccentric adjusting means respectively connecting each of the tie rods at their opposite ends to the steering arms, whereby three separate independent eccentric adjustments are provided.

3. In a vehicle having a frame, a pair of transversely spaced steerable wheels, a pair of means respectively mounting the wheels on transversely spaced, vertical axes for steering, a pair of steering arms respectively connected to the wheels, a pair of transverse tie rods joined centrally of the pair of wheels by an eccentric adjusting means, other eccentric adjusting means respectively connecting each of the tie rods at their opposite ends to the steering arms, whereby three separate independent eccentric adjustments are provided, and a locking plate for each eccentric adjusting means whereby movement of each eccentric means is prohibited until its associated plate is released.

GORDON G. McNAMARA, JR.